Sept. 9, 1952  K. I. STUBBS  2,609,723
HIGH SHEAR BLIND FASTENER
Filed Feb. 24, 1947
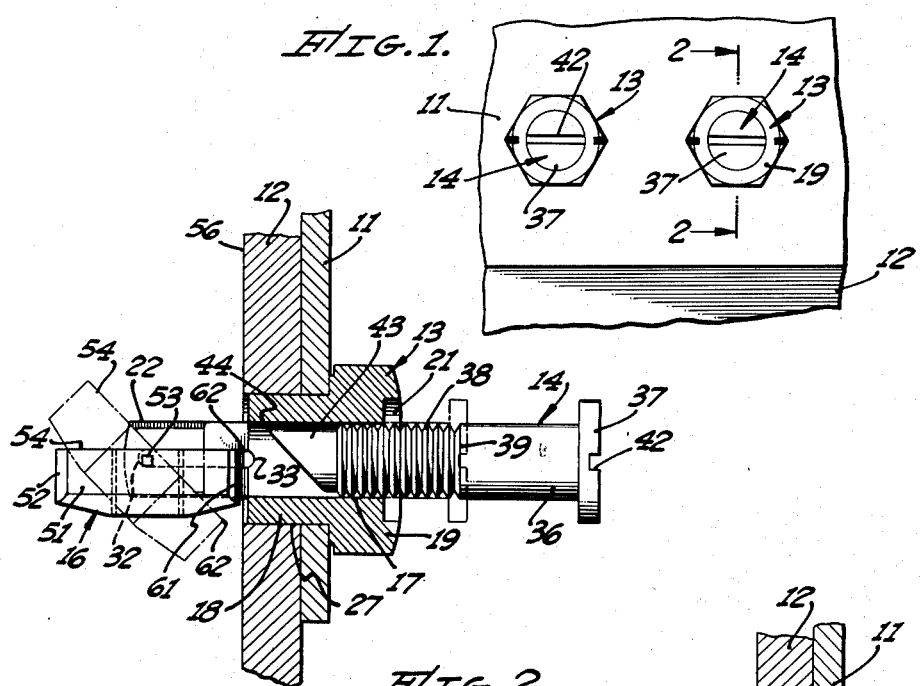
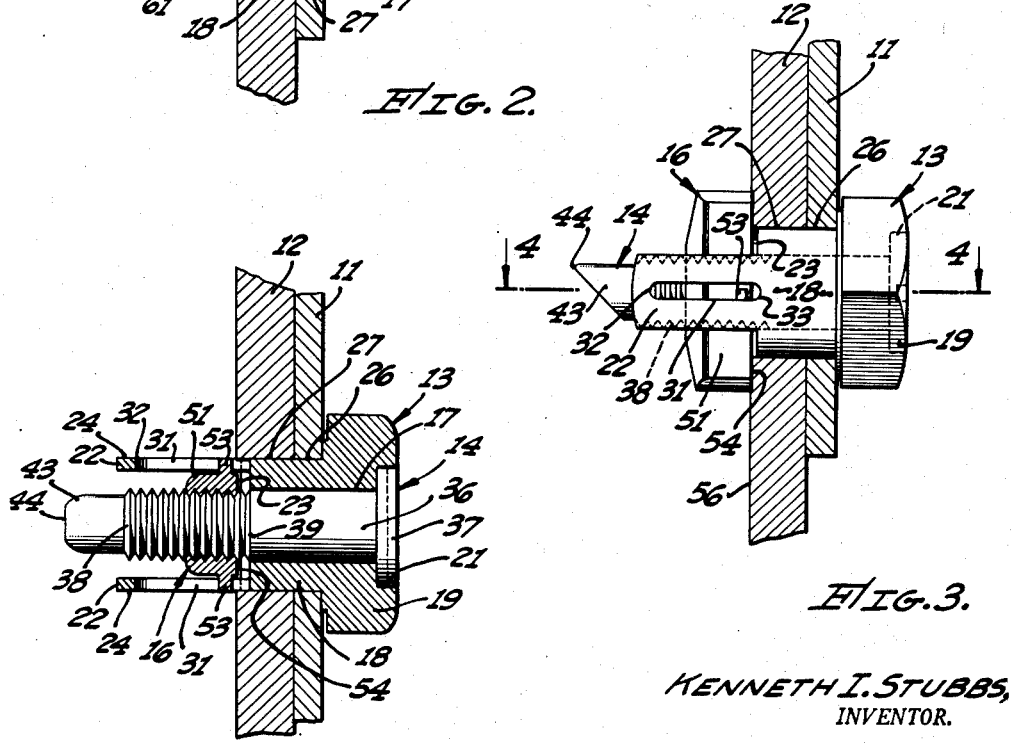
KENNETH I. STUBBS,
INVENTOR.
BY
Stuart M. Maule
ATTORNEY.

Patented Sept. 9, 1952

2,609,723

UNITED STATES PATENT OFFICE 2,609,723

HIGH SHEAR BLIND FASTENER

Kenneth I. Stubbs, Los Angeles, Calif.

Application February 24, 1947, Serial No. 730,450

4 Claims. (Cl. 85—3)

This invention relates to fastening devices and, more particularly, to fastening devices of the type that are known in the trade as "toggle bolts" or "blind bolts."

In many industries, and particularly in the fabrication of aircraft, difficulty is frequently encountered in fastening a plurality of elements together, as, for example, in securing the skin of an airplane to the structural framework, because of the fact that the inner end of the fastening element extends into a space that is inaccessible, thus making it difficult or impossible to position a nut in such a manner that a screw can be engaged therewith, as well as to hold the nut from turning while the screw is being tightened. This difficulty in aircraft construction has been partially solved in the past by permanently affixing a nut to the inner surface of the innermost of the members to be fastened together in position to receive a screw after the parts have been assembled. This has often proved disadvantageous because of the impossibility of replacing the nut should it become damaged. Another partial solution was the use of "explosive" rivets, the inner end of which are swaged to riveted form by the explosion of a charge provided within the inner end of the rivet when sufficient heat is applied to the rivet's outer end. This method also has frequently proved disadvantageous because of the impossibility of removing the fastening device without damage to the members joined by the rivet.

It is an object of the present invention to provide a fastening device capable of solving this problem effectively by providing means operable from the accessible side of a structure for positioning a nut within an inaccessible space within that structure and with its bore in register with a hole through one or more pieces of material defining the inaccessible space, so that a screw thrust through the hole can enter the nut without any necessity for the operator to reach into the space in order to obtain the proper positioning of the nut or to hold the nut against turning while the screw is being tightened.

A more detailed object of the present invention is to provide a fastening device of the general character described wherein the nut is carried by a stud which is adapted to extend through the hole in the members being fastened together and which is of such design that it is capable of being manipulated from the outer, or accessible, side of the members, and which stud, moreover, is of tubular form which permits the screw to extend through the stud into proper operative engagement with the nut.

A further object in this connection is to provide a "blind bolt" construction as described, wherein the hole through the members being fastened together is substantially completely filled by the metal of which the fastening device is formed, thus yielding a joint of maximum efficiency in shear as well as in tension.

A still further object in this connection is to form the nut of my improved fastening device so that it is relatively long in proportion to its width, its width being less than the outside dimention of the shank of the stud so that when the nut is turned in such a manner as to dispose its longitudinal axis parallel to the axis of the stud, both the nut and the stud can be thrust readily through the hole in the members being fastened together, which hole need not be of greater diameter than the shank of the stud.

Another object is to fashion the nut in such a manner that its length is greater than the outside diameter of the stud and, hence, capable of engaging the inner surface of the innermost of the members being fastened together, when the nut has been rotated through 90° after having been inserted lengthwise through the hole in the members, with the result that when the screw is thrust through the bore of the stud, engaged with the threads of the nut, and then tightened, the members will be firmly clamped together between the head of the screw and the nut bearing against the inner surface of the innermost member.

It is a further object of the present invention to provide a fastening device of the general character indicated wherein the nut is mounted upon one or more extensions on the inner end of the stud, the nature of the mounting being such as to permit both the rotary motion of the nut necessary to enable the nut to turn through at least the 90° of rotation hereinabove referred to, and also the sliding movement toward the stud which is necessary to permit the nut to be drawn toward and into clamping engagement with the inner surface of the innermost of the members being fastened.

Yet another object is so to design the means for mounting the nut upon the inner end of the stud that rotary motion of the nut with respect to the stud and about the stud's axis is prevented, thus providing means accessible outside the structure for positively holding the nut against turning with the screw when the latter is tightened.

Another object is to provide a fastening device of the "blind bolt" type as described, which is relatively simple in design and construction and which is correspondingly inexpensive to manufacture, which lends itself readily to quantity production, which is possessed of several features of advantage which contribute to the ease and surety of its operation, and which is capable of clamping members together with fully as much pressure and as much surety against inadvertent dislodgment as any ordinary fastening device of more conventional design.

The invention possesses other objects and valuable features, some of which, with those enumerated, will be set forth in the following description of the preferred form of my invention illustrated in the drawing accompanying and forming part of the specification. It is to be understood that I do not limit myself to the showing made by the said drawing and description, as I may adopt variations of the preferred form within the scope of my invention as set forth in the claims.

Referring to the drawing:

Figure 1 is a view in front elevation of a lap joint, the overlapping members of which are fastened together by means of fastening devices incorporating the principles of the present invention.

Figure 2 is an enlarged longitudinal, medial, vertical, sectional view taken through one of the fastening devices of Figure 1 on the line 2—2 of that figure with the direction of view as indicated. This figure shows the stud and nut in position to receive the tightened screw, but prior to engagement of the latter with the nut.

Figure 3 is a view in side elevation of the fastening device of Figure 2, but showing its parts in the respective positions assumed thereby when the screw is tightened to its final clamping position.

Figure 4 is a longitudinal, medial, sectional view taken upon the line 4—4 of Figure 3, with the direction of view as indicated.

The drawing illustrates the preferred embodiment of my improved "blind bolt" as the medium with which the overlapping edges of two plates 11 and 12 are secured together with the understanding, however, that there is no implication that this is the only type of member for the interconnection of which the fastening devices of the present invention may be employed advantageously. As illustrated, the fastening device comprises three principal members, to wit: a stud 13, a screw 14 and a nut 16, each of which parts, as well as their manner of inter-association, will be described in detail hereinbelow.

The stud member 13 is a tubular form, being provided with an axial bore 17 extending completely through its shank 18, and a head 19 larger than and formed on the outer end of the shank 18. The head 19 is also preferably provided with a counterbore 21 in its outer surface. A pair of fingers 22 rigid and preferably integral with the stud 13, extend beyond the inner end 23 of the stud's shank 18, these fingers being disposed in spaced parallel relation and with their outer lateral faces 24 spaced from each other a distance no greater than the outside diameter of the shank 18, with the result that the fingers 22 do not interfere with thrusting the shank 18 of the stud 13 through aligned holes 26 and 27 in the overlapping plates 11 and 12, to which holes the shank 18 is fitted. Each of the fingers 22 is provided with a longitudinally-extending slot 31, each of which extends from a point 32, adjacent the outer end of the associated fingers 22 to a point 33 just beyond the inner end 23 of the stud's shank 18, i. e., the distance from the point 33 to the head 19 of the stud 13, is slightly less than the distance between the stud's inner end 23 and its head 19.

The screw 14 comprises a shank 36 and a head 37 on the outer end thereof, the diameter of the shank 36 being so proportioned with respect to the internal diameter of the bore 17 of the stud 13 that it fits nicely therein. The inner end of the shank 36 is provided with threads 38 which extend along the shank toward the head 37 to a point 39 only slightly beyond the inner end 23 of the stud's shank 18 when the screw 14 is in its final, tightened position. Accordingly, the smooth or unthreaded portion 41 of the shank 36 substantially completely fills the bore 17 of the stud 13. This detail is of importance when considered in connection with the fact that the shank 18 of the stud 13 substantially completely fills the holes 26 and 27 in the plates 11 and 12, respectively, because it develops the maximum cross-section of metal capable of resisting any tendency toward shearing of the fastening device, thus overcoming one of the principal objections of "toggle bolts" of more conventional design which require an opening through the members to be interconnected which is larger than that portion of the fastening device which occupies the hole when the fastening device is tightened.

Also, the head 37 of the screw 14 is preferably proportioned to fit nicely within the counterbore 21 of the stud's head 19, with the result that when the fastening device is in its final, tightened relation, the outer surface of the stud's head 19 and the outer surface of the screw's head 37 are substantially flush and present a substantially smooth outer end of the fastening device interrupted only by the kerf 42 in the head 37 of the screw 14.

Beyond the inner end of the threads 38, the shank 36 of the screw 14 is provided with an extension 43 of reduced diameter, this diameter being no greater than the root diameter of the threads 43. The inner end of the extension 38, instead of extending in a plane perpendicular to the axis of the screw, is disposed obliquely thereto, thus presenting an acute angle at the extreme inner end of the extension 43 which, instead of being sharp, is formed about a short radius so as to provide a rounded entering point 44.

The nut 16 is relatively long and narrow. Its width, i. e., its dimension measured perpendicularly to the axis of its bore and perpendicular to its two side faces 51 (see Figure 4), is sufficiently less than the distance between the two inner faces of the fingers 22 to permit the nut 16 to move freely therebetween. The length of the nut, i. e., its dimension measured perpendicularly to the axis of its bore and perpendicular to the two end faces 52 (see Figure 2), is materially greater than the diameter of the shank 18 of the stud 13. Axially aligned trunnions 53 extend outward from the two lateral faces 51, the axis of these trunnions 53 preferably being closely adjacent the working face 54 of the nut, i. e., the face of the nut which bears against the inner face 56 of the innermost of the two plates 12 when the fastening device is tightened.

By offsetting the trunnions 53 from the center of the nut to a position closely adjacent the nut's working face 54, a structure is presented whereby the center of gravity of the nut is not intersected by the axis of its supporting trunnions, with the result that when the stud 13 is thrust through a hole, the axis of which is horizontal or substantially so, the nut will be swung by gravity to that position which is illustrated in Figure 1, it being understood that the trunnions 53 are engaged within the two opposite slots 31 of the arms 22, thereby mounting the nut 16 upon the arms 22 in such a manner that it is capable of rotary motion with respect to the stud about the axis of its trunnions 53 and also capable of sliding movement toward and away from the inner end 23 of stud 13.

However, possibly a more important advantage arising from the described location of the trunnions 53 with their axis offset from the center of the nut toward the working face 54, is that when the nut 54 is swung to its Figure 2 position, i. e., with its longitudinal axis extending substantially parallel to the axis of stud 13, the body of the nut 54 will be offset from the bore 17 of the stud 13, far enough for the entering point 44 of the screw 14 to be thrust past that end 61 of the nut which is directed toward the approaching end of the screw 14. Consequently, as the screw 14 is advanced through the bore 17 of the stud 13, the inclined face defining the leading end of the screw will become so engaged with the corner 62 of the nut 16 at the intersection of the working face 54 and the said end 61 that rotary motion will be imparted to the nut 16 about the axis of the trunnions 53, rotating it from that position which is illustrated in full lines in Figure 2, past the position which is illustrated in broken lines in the same figure, and into the position (not illustrated) wherein its bore is aligned with the bore 17 and, hence, ready to receive the advancing screw 16.

However, when in this position, the nut 16 is spaced away from the plate 12 but it can be drawn toward the plate and into clamping engagement therewith by rotation of the screw 14 after it has been pushed through the bore 17 far enough for its threads 38 to become engaged with the threads of nut 16. Thereafter, by rotating the screw 14, the engagement between its threads 38 and those of the nut will cause the nut to be drawn into clamping engagement with the plate 12. Inasmuch as the head 37 of the screw 14 bears against the outwardly-directed face of the stud 13 and the under face of the stud's head 19 bears against the outer face of the outermost of the two plates 11, tightening the screw 14 will impose tension thereupon, and thus exert a clamping action, pressing the two plates 11 and 12 firmly together.

Preferably, the trunnions 53, instead of being of circular cross-section, are substantially square and so dimensioned that their greatest diagonal is equal to or slightly greater than the width of the associated slot 31. Such arrangement causes the nut 16 to be releasably retained in that position in which it is illustrated in Figure 2, i. e., extending longitudinally parallel to the shank 18 of the stud 13, thus facilitating thrusting the nut 16 and the shank 18 of the stud through the aligned holes 26 and 27. However, the leverage exerted by the advancing inclined inner end of the screw 14 is sufficient to force the square trunnions to turn so as to swing the nut into position for the reception of screw 14 into the nut's bore. Obviously the non-circular trunnions 53 also facilitate holding the nut 52 in its Figure 2 position while the stud 13 is being withdrawn from the plates 11 and 12. In order to rotate the nut from its operative position to the Figure 2 position and thus permit withdrawal of the stud, it is necessary only to reach through the stud's bore 17 with a relatively long and thin tool in such a manner as to engage the nut 16 at a point offset from the axis of the trunnions 53, and then by pushing with the tool to turn the nut. This permits removal of the entire fastening device for such purposes as separation of the plates 11 and 12 or replacement of the nut 16 in the event it should become damaged, and constitutes one of the important advantages of the "blind bolt" of the present invention, inasmuch as those of more common design are not removable without damage to the members clamped thereby.

Thus it may be seen that I have provided a fastening device capable of positioning a nut in registry with aligned apertures in members to be clamped together and in position against the inner face of the innermost of those members to receive a screw inserted through the same apertures, even though the space defined by those members is inaccessible. Moreover, the fastening device of the present invention is capable of holding the nut stationary while the screw associated therewith is being tightened, this being accomplished by placing a wrench or other suitable holding tool upon the non-circular head 19 of the stud 13 while the screw 14 is tightened by means of a screwdriver, the blade of which is seated in the kerf 42. Since the nut 16 is narrower than the space between the parallel fingers 22 extending from the inner end of the stud's shank 18, the nut can easily be placed in operative position simply by thrusting it through the aligned holes in the members to be clamped and yet after the stud 13 of the screw 14 has been placed in position, these holes are substantially completely filled by the metal of which the stud and screw are made, with the result that the joint developed by means of the fastening devices of the present invention develops the highest efficiency in shear.

I claim:

1. In a fastening device of the character described, a stud having an axial bore therethrough and comprising a shank and means adjacent the outer end thereof providing an outer work-gripping surface, a screw comprising a threaded shank receivable within said bore and a head on the outer end of said screw's shank, said screw's shank substantially filling said stud's bore whereby said stud and screw co-operate in presenting a substantially solid section developing maximum resistance to shear, a nut providing an inner work-gripping surface, said nut being threaded complementarily to said screw's shank, and means mounting said nut on the inner end of said stud for rotary movement about an axis perpendicular to the bore of said nut and for sliding movement axially of said stud, said nut-mounting means holding said nut against turning with respect to said stud about said stud's axis, and said nut being extended in a direction perpendicular to its bore to a length greater than the diameter of said stud.

2. In a fastening device of the character described, a stud having an axial bore therethrough and comprising a shank and means adjacent the outer end thereof providing an outer work-gripping surface, a screw comprising a threaded shank receivable within said bore and a head on the outer end of said screw's shank, said screw's shank substantially filling said stud's bore whereby said stud and screw co-operate in presenting a substantially solid section developing maximum resistance to shear, a nut providing an inner work-gripping surface, said nut being threaded complementarily to said screw's shank, and means mounting said nut on the inner end of said stud for rotary movement about an axis perpendicular to the bore of said nut and for sliding movement axially of said stud, said nut-mounting means holding said nut against turning with respect to said stud about said stud's axis, and said nut being extended in a direction perpendicular to its bore to a length greater than the diameter of said stud, and the width of said nut measured parallel to the axis of its rotational mounting being at least as small as the diameter of said stud whereby said nut is enabled to pass through any hole adapted to receive said stud when said nut is turned to that position in which its length extends parallel to said stud.

3. In a fastening device of the character described, a stud having an axial bore therethrough, and comprising a shank and a head on the outer end of said shank, a screw comprising a threaded shank receivable within said stud's bore and a head on the outer end of said screw's shank, said screw's shank substantially corresponding in diameter to said stud's bore whereby said stud and screw co-operate in presenting a substantially solid section developing maximum shear strength, a pair of spaced fingers rigid with said stud's shank and extending beyond the inner end thereof, each of said fingers having a slot extending longitudinally thereof, a nut disposed between said fingers, and axially aligned trunnions extending laterally from said nut and into said slots to mount said nut on said fingers thereupon for sliding movement longitudinally thereof and for rotary movement with respect thereto about an axis extending laterally of said nut and perpendicular to said nut's bore, said nut being extended in a direction perpendicular to its bore and perpendicular to its said lateral axis to a length greater than the diameter of said stud's shank.

4. In a fastening device of the character described, a stud having an axial bore therethrough, and comprising a shank and a head on the outer end of said shank, a screw comprising a threaded shank receivable within said stud's bore and a head on the outer end of said screw's shank, a pair of longitudinally slotted fingers rigid with said stud's shank and extending beyond the inner end thereof in spaced parallel relation, a nut disposed between said fingers and a pair of axially aligned trunnions extending laterally from said nut and into rotatable and slidable engagement within the slots in said fingers, at least one of said trunnions being of non-circular cross-sectional form, the longest diameter of said non-circular trunnion being slightly greater than the width of the associated one of said slots to retain said nut in selected position about the axis of said trunnions but said largest diameter being greater than the width of the associated slot by such a slight amount that only a moderate force is required to spring the associated finger to permit said non-circular trunnion to turn in its associated slot and thereby enable said nut to turn to another selected position about the axis of said trunnions, said nut being extended in a direction perpendicular to its bore and perpendicular to the axis of said trunnions to a length greater than the diameter of said stud's shank.

KENNETH I. STUBBS.

REFERENCES CITED

The following references are of record in the file of this patent:

UNITED STATES PATENTS

| Number | Name | Date |
|---|---|---|
| 991,426 | Clements | May 2, 1911 |
| 1,352,919 | Salmons | Sept. 14, 1920 |
| 2,404,169 | Gidden | July 16, 1946 |

FOREIGN PATENTS

| Number | Country | Date |
|---|---|---|
| 589,084 | Great Britain | June 11, 1947 |